Patented Aug. 29, 1950

2,520,181

UNITED STATES PATENT OFFICE 2,520,181

PROCESS OF PREPARING AMINES AND NITRILES FROM AMMONIA AND OLEFINS

John W. Teter and Leonard E. Olson, Chicago, Ill., assignors to Sinclair Refining Company, New York, N. Y., a corporation of Maine No Drawing. Application August 31, 1946, Serial No. 694,434

4 Claims. (Cl. 260—465.3)

This invention relates to improvements in the production of nitrogen-containing products, particularly nitriles, by the direct catalytic reaction of olefins with ammonia. It includes improvements in the process and improved catalysts which are more economical than the catalysts heretofore considered most effective in promoting the production of nitrogen-containing products, particularly nitriles of low molecular weight, while effectively serving to promote the reaction and give high yields of the desired products while repressing to a substantial extent pyrolitic decomposition reactions of the hydrocarbon, such as cracking and polymerization, with production of hydrocarbon polymer, tarry and carbonaceous material and the like.

The production of nitrogen-containing products, particularly nitriles, by the catalytic reaction of ammonia with olefins, and catalysts useful for that purpose, have been described in Patents 2,381,709, 2,381,470, 2,381,471, issued August 7, 1945; 2,392,107, issued January 1, 1946; 2,418,562, issued April 8, 1947; 2,406,929, issued September 3, 1946; 2,398,899, issued April 23, 1946, and Teter application Serial No. 444,095, filed May 22, 1942, now abandoned. Teter application Serial No. 605,832, filed July 18, 1945, now abandoned, describes cobalt-containing catalysts which are particularly effective. In such processes, temperatures ranging from about 400° F. to about 725° F. are used, temperatures of about 640° to 650° F. being particularly useful where the olefin is propylene, with somewhat higher temperatures representing the most effective range where the olefin is ethylene. Catalysts which have been described as useful in this procedure in general include reduced metal oxides deposited on an inert carrier. The easily reducible metals, cobalt, nickel, and iron, have been described as most useful, with cobalt outstanding.

The present invention provides improvements in this process which involve the use of highly effective catalysts which are less costly than the cobalt catalysts which have heretofore been regarded as the most effective catalysts. It includes these catalysts and their preparation. The advantages of the invention lie in a high yield of nitrogen-containing products, particularly the desired nitriles, based upon olefin feed and olefin consumed, long catalyst life, relatively low production of secondary or waste products, and of particular importance, low catalyst costs.

The catalysts used in the practice of the invention are reduced metal oxide catalysts containing cobalt and another metal of the type which, in oxide form, has the capacity of forming spinel-type crystal structures, with cobalt oxide, deposited on an inert carrier, such as diatomaceous earth, titanium dioxide, heat-treated bentonite, heat-treated magnesium silicate, aluminum oxide, either as bauxite or corundum, deactivated by heating, or the like. While the effective catalytic material in the new catalyst is the reduced metal oxide, consisting of an admixture of reduced cobalt oxide and the oxide of the other metal, the exact structure of the catalytic material in the catalyst is not known, nor is it known whether, in the course of preparation of the catalyst, a spinel-type crystal structure at any time in fact exists. It is, however, metals of the type which in the form of their oxides, form spinel-type structures with cobalt oxides, which are included in the new catalysts in association with the reduced cobalt oxide.

In general, in the new catalysts, the cobalt and the other catalytic metal will be included in proportions such as correspond to the production of spinel-type crystals when the metals are in the form of their oxides; that is, in general, the molar proportions of cobalt and other metal will range from about 1:2 to about 2:1, although somewhat less of the second metal, or even more, can be included in the catalyst without departing from the invention. The proportions of metal and inert carrier of the finished catalyst will in general be such that about one-half the weight of the finished catalyst is reduced metal oxide, although it will be understood that the metal may be used in larger or smaller proportions than this.

In general, in the new catalysts, it is desirable to keep the sulfate content low, usually not exceeding 0.2%, and the chloride content low, not exceeding about 0.1%. Sodium, in small quantities, appears to be an activator or promoter, and may be present in quantities ranging from a fraction of 1%, e. g., 0.2% to 0.3% up to 3% or 4%, or even somewhat more. In general, the promoting effect of sodium becomes particularly noticeable when the amount of sodium exceeds about 1%.

The new catalysts are advantageously prepared in the form of small agglomerates or granules, as by pelleting or extrusion, after deposition of the metal on the inert carrier, and in the process, will advantageously be used in the form of a fixed bed, with the mixture containing the ammonia and olefin being passed through the bed.

The new catalysts are capable of reactivation by hydrogen after having been onstream for a period of time sufficient to cause the catalyst to lose some of its initial activity, and may be used with advantage in the cyclic process described in Patent 2,419,470, issued April 22, 1947, in which two or more reactors are used in parallel, with one reactor onstream while the other is being reactivated by passing hydrogen through it followed by an ammonia purge. In general, in using the new catalyst, it is advantageous to include a small amount of water in the feed to maintain the catalyst in its most effective condition, as described in Patent 2,417,893, issued March 25, 1947. It is also advantageous to use a large excess of ammonia in the process, as described in Patent 2,417,892, issued March 25, 1947.

A number of metals, other than cobalt, which in the form of oxides, can form spinel-type crystal structures with cobalt oxide, may be used in the practice of the invention. Of particular importance are nickel and zinc, either of which may be used alone along with the cobalt. Effective catalysts may also be produced involving the use of both nickel and zinc along with the cobalt. Other metals which may be used include manganese, copper, iron, magnesium, calcium, barium, strontium, and aluminum, and these may be used along with the cobalt, or various mixtures may be used with the cobalt. In general, if one or more than one of the metals other than cobalt are included in the catalyst, the proportion of the additional metal used will be such that the molar ratio of cobalt to other metal, or where more than one metal is used, metals lies between 1:2 and 2:1.

The new catalysts are prepared by depositing the catalytic metal on the inert carrier, for example, as the hydroxide or carbonate, calcining the resulting material to convert the metal to the oxide or mixture of oxides, and then reducing the resulting metal oxide with hydrogen. The exact structure of the resulting reduced metal mixture is not known. That is, it is not known whether in the active catalyst, the metal is present as such, or whether part of it is present as such, with the remainder present as an oxide, or mixture of oxides, or whether the effective catalytic material represents some equilibrium mixture of metal, and one or more metal oxides. The reduced metal catalyst is pyrophoric, and ferromagnetic, and there are indications that it does contain definite proportions of both metal and metal oxide, and it may be that the active catalyst is metal activated by metal oxide, or the active material may be an intermediate oxide. The fact that the introduction of water along with the hydrocarbon and ammonia feed helps to maintain the catalyst at its greatest activity indicates that the active material may be a metal oxide or an admixture of metal with one or more oxides in some type of equilibrium influenced by the water.

The improved catalysts are advantageously prepared by depositing the metals, i. e., cobalt and one or more other metals, on the inert carrier by reaction of a mixture of the soluble metal salts with caustic soda or sodium carbonate in the presence of the slurried carrier. Cobalt sulfate, and the sulfate or other soluble salts of the other metal or metals, will ordinarily be used because of cost, but in general, the nature of the salts selected is not of great significance. Of course, where metals like calcium are used along with the cobalt, it is not desirable to use cobalt sulfate because of the possible formation of calcium sulfate in the catalyst, which would make difficult or prevent the reduction of the sulfate content to the desired low level in the final catalyst. After the cobalt and other metal or metals are deposited on the carrier in the form of the hydroxide or carbonate, the product is washed with demineralized water to remove soluble salts, and in particular, to remove sulfate and chloride ions, and is then calcined, pelleted, and reduced. Ordinarily, final reduction will be carried out in the reactor, although it is possible to reduce the catalyst in another vessel, and then stabilize it in the known way for transportation. A typical preparation of a catalyst of the invention will be illustrated by the following example.

*Example.*—A suspension of diatomaceous earth (Celite #337) in aqueous sodium carbonate containing 540 grams of the earth and 910 grams of sodium carbonate per gallon was prepared. The slurry was settled overnight and then heated to 90° C. with live steam. To it was added an equal volume of a solution containing 1275 grams of cobalt sulfate heptahydrate ($CoSO_4 \cdot 7H_2O$) and 597 grams of nickel sulfate hexahydrate ($NiSO_4 \cdot 6H_2O$) per gallon, corresponding to a cobalt-nickel ratio of 2:1. The addition of the salt solution took place over a period of ½ hour with intermittent high-speed agitation. The precipitated mass was stirred for another ½ hour and was then filtered. The filtered cake was dried at 105° C., ground, and washed, by repeated slurry and filtration, until the sulfate content was reduced to less than 0.1%. The cake was then dried, ground, calcined for two hours at 660° F. and pelleted, using 4% graphite as a lubricant. The catalyst was then introduced into a reactor and reduced, by purging with ammonia at 3,000 lbs. for two hours, then passing in hydrogen at atmospheric pressure for 12 hours, purging with ammonia at 3,000 lbs. for two hours, passing in hydrogen at atmospheric pressure for 8 hours, and then at 3,000 lbs. pressure for 4 hours, followed by purging with ammonia at 3,000 lbs. for 6 hours, this operation being carried out at 640° F. The sodium content of the catalyst was adjusted, prior to calcination, by the addition of sodium acetate, and in the catalyst was 1.95%.

The catalyst so prepared was then used in the production of nitrogen-containing products from a mixture of ammonia and hydrocarbon, the hydrocarbon being a typical PP fraction containing 41.4% of propylene with the remainder largely propane, with some ethane and higher hydrocarbon. The molar ratio of ammonia to olefin in the feed was 10:1. The olefin space velocity was 0.2. The temperature was 640° F., and the pressure 1500 lbs. per square inch. The operation was carried out in a cyclic manner, in accordance with the process described in Teter application Serial No. 558,484, now Patent No. 2,419,470 with intermittent 6 hour onstream and reactivation periods. The yield of nitrogen-containing products was 27.8%, calculated as propionitrile, and based on olefin feed. The catalyst showed a high activity and long life.

Other catalysts, prepared in essentially the same manner, but with different active catalytic materials, were also tested. Thus, a catalyst prepared in the same manner but using zinc nitrate and cobalt sulfate, in proportions to give a catalyst with a cobalt-zinc molar ratio of 2:1, gave a yield of 25% nitrogen-containing products calculated as propionitrile. Another catalyst prepared with cobalt sulfate and manganese acetate, in proportions to give a cobalt-manganese molar ratio of 2:1 gave a yield of 12.9%. Another catalyst prepared with copper sulfate and cobalt sulfate, in proportions to give a cobalt-copper molar ratio of 2:1, gave a yield of 15.3%. A catalyst prepared from cobalt sulfate and magnesium sulfate, in proportions to give a cobalt-magnesium molar ratio of 1:2, gave a yield of 19.3%. A catalyst prepared from cobalt sulfate, zinc nitrate, and nickel sulfate, in proportions to give a zinc-cobalt-nickel ratio of 1:1:1, gave a yield of 27.8%, and a catalyst prepared from zinc nitrate, cobalt sulfate and nickel sulfate, to give a zinc-cobalt-nickel molar ratio of 1:4:1, gave a yield of 27.8%. Typical data with respect to the catalyst in these various runs and the operating conditions of the runs, are given in the following table:

Table

| Catalytic metal | Cu:2Co | Zn:2Co | Mn:2Co | 2Mg:Co | Ni:2Co | Zn:Co:Ni | Zn:4Co:Ni |
|---|---|---|---|---|---|---|---|
| Na content | 0.82 | 0.59 | 0.79 | 0.41 | 1.95 | 0.27 | 0.37 |
| SO₄ content | 0.02 | 0.01 | 0.01 | 0.005 | 0.049 | 0.102 | 0.115 |
| Temp., °F | 640 | 640 | 640 | 640 | 640 | 640 | 640 |
| Pressure, #/sq. in | 1,500 | 1,500 | 1,500 | 1,500 | 1,500 | 1,500 | 1,500 |
| Olefin SV (Liq. V./cat. V.hr) | 0.23 | 0.19 | 0.238 | 0.25 | 0.21 | 0.2 | 0.2 |
| NH₃:Olefin ratio | 8.97 | 11.2 | 8.75 | 10.4 | 10 | 10.9 | 11 |
| H₂O in NH₃, Wt. Percent | 0.2 | 0.2 | 0.2 | 0.2 | 0.2 | 0.2 | 0.2 |
| Percent Olefin in HC | 41 | 41 | 40 | 40.2 | 40.2 | 39.5 | 40.2 |
| Yield, Percent | 15.3 | 25 | 12.9 | 19.3 | 27.8 | 27.8 | 26.2 |

It will be noted that the catalysts containing zinc and cobalt are particularly effective. One of the most effective catalysts contains nickel, zinc and cobalt in molar ratios of 1:1:1, and such a catalyst is of particular advantage because it contains but one-third the amount of cobalt that an active cobalt catalyst contains, and thus may be prepared at a very much lower cost, a factor of great importance in the process, because catalyst cost, despite reactivation and oxidative regeneration, is a major item of expense in the amination process.

The catalysts described in the foregoing example have consisted of the catalytic metal deposited on diatomaceous earth. Other inert supporting materials may be used to give catalysts which are effective. Thus, instead of the diatomaceous earth, other porous carriers, such as heat-treated bentonite, heat-treated magnesium silicate, and alumina, including native bauxite and corundum, in particular after deactivation by heating for example to 1100° F. for one hour or more, may be used. Also, non-porous inert carriers such as titanium dioxide may be used. In general, the use of any of these carriers involves no modification of the technique involved in producing the catalyst or in its handling for use.

The important characteristic of the catalysts of the invention lies in the combination of the reduced cobalt oxide with the reduced oxide of another metal which, as the oxide, can form spinel-type crystal structures with cobalt oxide. It is not necessary that, in the course of production of the catalyst, such spinel-type crystal structures actually exist at any time, and, indeed, in view of the fact that even in the calcining operation, the temperature to which the catalyst is subjected never exceeds substantially the temperature used in the reaction, and indeed, may not exceed about 650° F., although higher temperatures may be used, indicates that there may be doubt that a spinel-type crystal structure ever is produced. The mechanism of the catalytic effects of the material, and the structure of the catalytic material itself, are not yet fully understood, and the reference herein to metals, which in the form of oxides, can form spinel-type structures with cobalt oxide is not intended to imply that such structures are in fact produced or present, but rather to define the type of metal which serves as effective catalytic material when in association with reduced cobalt oxide in the catalyst.

We claim:

1. A catalyst effective in the production of nitrogen-containing products by the direct reaction of ammonia with olefin, said catalyst consisting essentially of an inert carrier and, supported thereon, a reduced metal oxide catalytic material including reduced cobalt oxide and reduced zinc oxide, the molar proportions of cobalt and zinc being between 1:2 and 2:1.

2. A catalyst effective in the production of nitrogen-containing products by the direct reaction of ammonia with olefin, said catalyst consisting essentially of an inert carrier, and, supported thereon, a reduced metal oxide catalytic material consisting of the reduction product of mixed cobalt, nickel, and zinc oxides, the molar proportions of cobalt and of combined nickel and zinc being between 1:2 and 2:1.

3. In a process for producing nitrogen-containing products from ammonia and olefin the improvement which comprises passing a mixture containing ammonia and the olefin, the ammonia being present in substantial excess, through a body of the catalyst defined in claim 1 while maintaining a temperature within the range from about 400° F. to about 725° F. in the region of catalyst contact.

4. In a process for producing nitrogen-containing products from ammonia and olefin the improvement which comprises passing a mixture containing ammonia and the olefin, the ammonia being present in substantial excess, through a body of the catalyst defined in claim 2 while maintaining a temperature within the range from about 400° F. to about 725° F. in the region of catalyst contact.

JOHN W. TETER.
LEONARD E. OLSON.

REFERENCES CITED

The following references are of record in the file of this patent:

UNITED STATES PATENTS

| Number | Name | Date |
|---|---|---|
| 1,920,795 | Jaeger | Aug. 1, 1933 |
| 2,101,104 | Smith et al. | Dec. 7, 1937 |
| 2,274,639 | Scheuermann et al. | Mar. 3, 1942 |
| 2,331,968 | Forney | Oct. 19, 1943 |
| 2,339,927 | Heckel | Jan. 25, 1944 |
| 2,370,797 | Kearby | Mar. 6, 1945 |
| 2,381,473 | Teter | Aug. 7, 1945 |
| 2,381,709 | Apgar et al. | Aug. 7, 1945 |
| 2,398,899 | Teter | Apr. 23, 1946 |